US009986152B2

(12) United States Patent
Saraya et al.

(10) Patent No.: US 9,986,152 B2
(45) Date of Patent: May 29, 2018

(54) INTELLIGENTLY CAPTURING DIGITAL IMAGES BASED ON USER PREFERENCES

(71) Applicant: International Business Machines Corporation, Armonk, NY (US)

(72) Inventors: Siddharth K. Saraya, Raniganj (IN); Alok K. Singh, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/226,723

(22) Filed: Aug. 2, 2016

(65) Prior Publication Data

US 2018/0041693 A1 Feb. 8, 2018

(51) Int. Cl.
| | |
|---|---|
| *H04N 5/232* | (2006.01) |
| *G06K 9/00* | (2006.01) |
| *H04N 1/44* | (2006.01) |
| *G06T 5/00* | (2006.01) |
| *G06T 5/20* | (2006.01) |

(52) U.S. Cl.
CPC ..... *H04N 5/23219* (2013.01); *G06K 9/00288* (2013.01); *G06T 5/002* (2013.01); *G06T 5/20* (2013.01); *H04N 1/4493* (2013.01); *H04N 5/23229* (2013.01); *H04N 5/23293* (2013.01); *G06T 2207/30201* (2013.01)

(58) Field of Classification Search
CPC .......... H04N 5/23219; H04N 5/23293; H04N 1/4493; H04N 5/23229; G06K 9/00288; G06T 5/002; G06T 5/20; G06T 2207/30201
USPC ...................... 348/211.1, 211.2, 211.3, 211.4
See application file for complete search history.

(56) References Cited

U.S. PATENT DOCUMENTS

| | | | |
|---|---|---|---|
| 6,937,163 B2 | 8/2005 | Caulfield et al. | |
| 8,157,396 B2 | 4/2012 | Smith, Jr. et al. | |
| 9,140,444 B2 | 9/2015 | Connor | |
| 9,171,181 B2 | 10/2015 | Balusu et al. | |

(Continued)

FOREIGN PATENT DOCUMENTS

| | | |
|---|---|---|
| WO | 2013095977 A1 | 6/2013 |
| WO | 2014046778 A2 | 3/2014 |

OTHER PUBLICATIONS

Aguilar, Nelson: "Remove Moving Objects & Unwanted People from Photos on Your Galaxy S5", http://gs5.wonderhowto.com/how-to/remove-moving-objects-unwanted-people-from-photos-your-galaxy-s5-0154927/, Retrieved Aug. 2, 2016.

*Primary Examiner* — Yogesh Aggarwal
(74) *Attorney, Agent, or Firm* — Patterson + Sheridan, LLP

(57) ABSTRACT

Systems, methods, and computer program products to perform an operation comprising receiving image data provided by an image sensor, identifying, based on a facial recognition algorithm applied to the image data, a first face in the image data, identifying a plurality of rules applicable to capturing images based on the image data, and upon determining that a first rule of the plurality of rules restricts depiction of the first face in an image: performing a predefined operation to restrict depiction of the first face in the image data provided by the image sensor, and subsequent to performing the predefined operation to the image data, generating an image for output based on the image data, wherein the generated image does not depict the first face.

20 Claims, 7 Drawing Sheets

(56) References Cited

U.S. PATENT DOCUMENTS

| | | | |
|---|---|---|---|
| 2010/0245042 A1* | 9/2010 | Tsubaki | G06F 21/32 340/5.82 |
| 2013/0194438 A1 | 8/2013 | Sweet, III et al. | |
| 2014/0289203 A1* | 9/2014 | Chan | G06F 17/3082 707/652 |
| 2015/0113661 A1 | 4/2015 | Mishra | |
| 2016/0034704 A1* | 2/2016 | Shim | H04N 1/4486 726/26 |

* cited by examiner

INTELLIGENTLY CAPTURING DIGITAL IMAGES BASED ON USER PREFERENCES

BACKGROUND

The present invention relates to digital image capture, and more specifically, to intelligently capturing digital images based on user preferences.

Cameras have become an integral part of daily life. With the proliferation of mobile devices that include cameras, most people carry a camera at all times. As such, users can capture images at any time.

SUMMARY

In one embodiment, a method comprises receiving image data provided by an image sensor, identifying, based on a facial recognition algorithm applied to the image data, a first face in the image data, identifying a plurality of rules applicable to capturing images based on the image data, and upon determining that a first rule of the plurality of rules restricts depiction of the first face in an image: performing a predefined operation to restrict depiction of the first face in the image data provided by the image sensor, and subsequent to performing the predefined operation to the image data, generating an image for output based on the image data, wherein the generated image does not depict the first face.

In another embodiment, a system comprises a processor and a memory storing instructions, which when executed by the processor, performs an operation comprising receiving image data provided by an image sensor, identifying, based on a facial recognition algorithm applied to the image data, a first face in the image data, identifying a plurality of rules applicable to capturing images based on the image data, and upon determining that a first rule of the plurality of rules restricts depiction of the first face in an image: performing a predefined operation to restrict depiction of the first face in the image data provided by the image sensor, and subsequent to performing the predefined operation to the image data, generating an image for output based on the image data, wherein the generated image does not depict the first face.

In another embodiment, a computer-readable storage medium has computer-readable program code embodied therewith, the computer-readable program code executable by a processor to perform an operation comprising receiving image data provided by an image sensor, identifying, based on a facial recognition algorithm applied to the image data, a first face in the image data, identifying a plurality of rules applicable to capturing images based on the image data, and upon determining that a first rule of the plurality of rules restricts depiction of the first face in an image: performing a predefined operation to restrict depiction of the first face in the image data provided by the image sensor, and subsequent to performing the predefined operation to the image data, generating an image for output based on the image data, wherein the generated image does not depict the first face.

DETAILED DESCRIPTION

Embodiments disclosed herein provide enhanced techniques for image capture that are based on the rules and/or settings of one or more users. For example, a user of a smartphone which includes a camera may specify in a user profile to only include the faces of people in an image for whom the user has stored personal contact information. When the user attempts to capture an image using the smartphone, the smartphone may perform facial recognition on all faces in the image data, and attempt to match each face in the image data to one of the user's contacts (e.g., stored contacts, social media contacts, and the like). If a face does not match any of the user's contacts, the smartphone may perform a predefined operation to ensure that the face (and/or the body) is not depicted in a resultant image generated by the smartphone user. For example, the predefined operation may include applying filters to blur the face, placing an object over the face, or any other type of operation to obfuscate the face, prior to capturing the image.

In addition, embodiments disclosed herein may leverage rules of nearby users when capturing images. Generally, users may specify a set of personal privacy rules and/or settings in their personal profile. For example, a first user may specify that they do not wish to be depicted in any image, regardless of who is capturing the image. A device with a camera may then receive the profile data (which may include an image of the respective user) from each nearby user via a wireless communication interface. When a user subsequently activates their camera, the device may perform facial recognition to determine whether each face in the image data of the camera sensor is associated with a nearby user (based on the user images received in the user profile). If a matching user is identified, the rules associated with that user may be applied before an image is generated. For example, if the first user is identified, the first user's face may be removed or otherwise obscured in the image data such that a resultant image does not depict the first user's face.

Figure 1A:
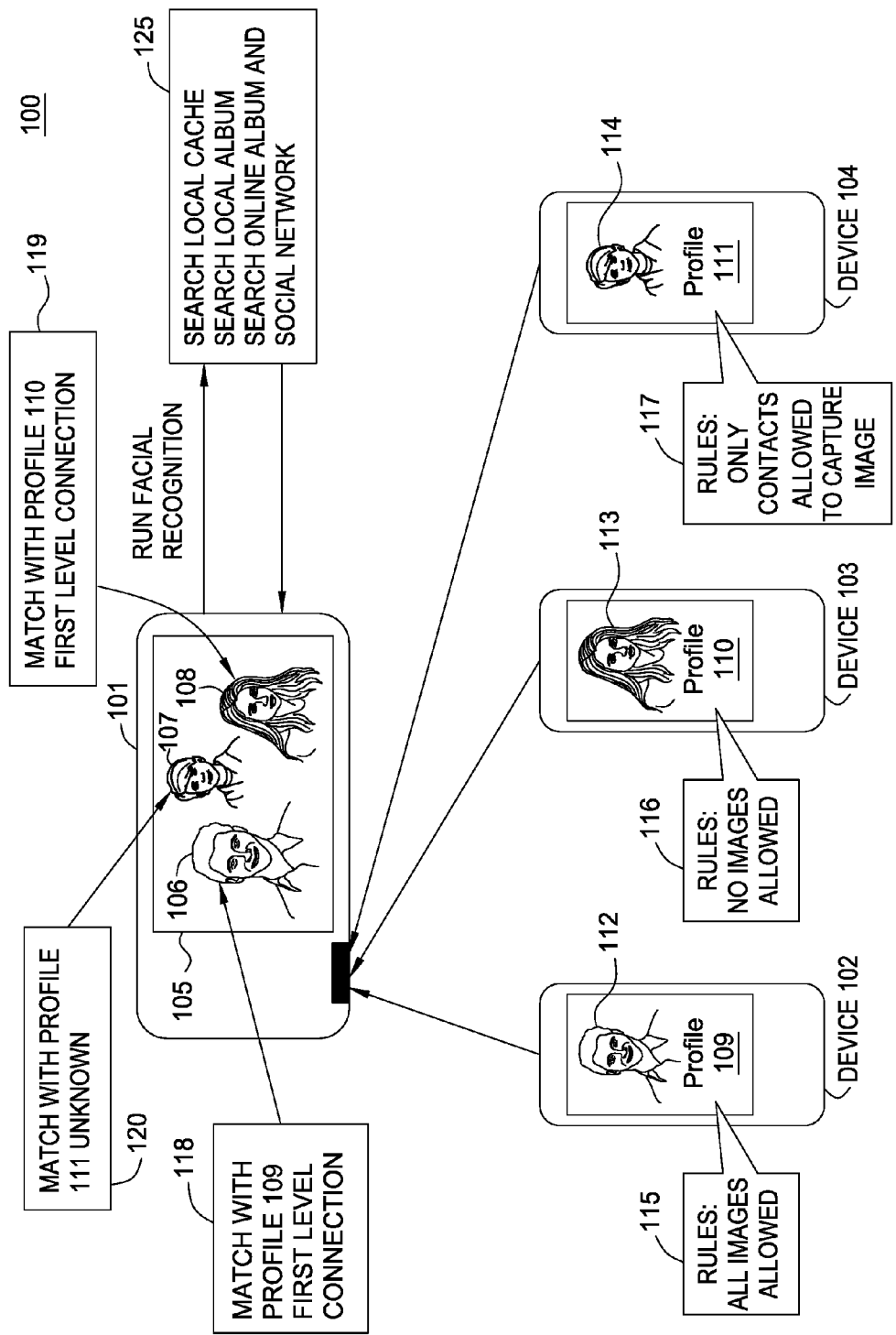
FIGS. 1A-1B illustrate an example system architecture which intelligently captures digital images based on user preferences, according to one embodiment.

FIG. 1A illustrates an example system architecture 100 which intelligently captures digital images based on user preferences, according to one embodiment. As shown, the system 100 includes an image capture device 101. The image capture device 101 is representative of any device which captures digital images, such as a digital camera, digital single-lens reflex (DSLR) camera, smartphone, tablet computer, laptop computer, portable gaming device, and the like. The system 100 also includes three example computing devices 102-104. The computing devices 102-104 are representative of any type of computing device which can wirelessly communicate with the image capture device 101, such as a wearable device, digital camera, DSLR camera, smartphone, tablet computer, and the like.

As shown, a display 105 of the image capture device 101 outputs a visual depiction of the image data captured by an image sensor of the image capture device 101. As shown, the display 105 depicts three people 106-108 that would be depicted in an image generated by the image capture device 101 responsive to user input specifying to capture an image. However, a user of the image capture device 101 may not know one or more of the people 106-108, and might not wish to have these people depicted in the images they capture (or generate). Furthermore, one of the people 106-108 may not like being photographed, and do not want to be depicted in digital images generated by the image capture device 101.

Advantageously, the image capture device 101 is configured to apply user-defined rules when capturing images such that the images depict only those people that are desired to be included by the user capturing the image, and only those people whose user preferences permit the depiction of their likeness in the image. For example, a user of the image capture device 101 may specify, in their user profile, a rule that only allows personal contacts to be depicted in the images generated by the user. Therefore, when capturing images, the image capture device 101 may process the image data provided by the image sensor of the image capture device 101 using a facial recognition algorithm. The facial recognition algorithm may then match the faces of the people 106-108 to one or more data sources 125, such as a local cache of profile images stored on the image capture device, local image albums stored on the image capture device 101, and remote data sources (such as social media platforms, and the like). If the image capture device 101 identifies a match between the face of the people 106-108, the image capture device 101 may confirm that the person is a personal contact of the user of the image capture device 101. For example the image capture device 101 may determine whether the match was based on a profile image of a contact stored in the image capture device 101, whether the match was based on a profile image of a social media connection, and the like. However, if the image capture device 101 does not identify a match, or a matching person is not determined to be a personal contact of the user of the image capture device 101, the image capture device 101 may perform a predefined operation to restrict the person 106-108 from being depicted in an image subsequently generated by the image capture device 101.

As shown, each device 102-104 stores a respective user profile 109-111. Each user profile may include a respective image 112-114 of the associated user, and a set of rules 115-117 defined by each user. As shown, for example, the rules 115 of user profile 109 specify that the user has permitted the depiction of their image by permitting all images. As another example, the rules 116 of user profile 110 specify that no images of the associated user are permitted. As yet another example, the rules 117 of user profile 111 specify that only personal contacts are allowed to capture their image. Therefore, from the perspective of the image capture device 101, the rules and settings defined by a user of the image capture device 101 may be referred to "local rules," and the rules and settings in the rules 115-117 may be referred to as "remote rules." Similarly, the rules 115 may be referred to as "local rules" from the perspective of the device 102, while the rules 116-117 and rules associated with the image capture device 101 may be referred to as "remote rules" from the perspective of the device 102.

When in proximity (e.g., when within a predefined distance), image capture device 101 may communicate with each of the devices 102-104. Generally, the devices 101-104 may use any method to determine whether the other devices 101-104 are within proximity. In at least one embodiment, the image capture device 101 uses global positioning system (GPS) coordinates to determine whether the devices 102-104 are in proximity. In another embodiment, the image capture device 101 may use signal strength of wireless signals to determine the respective distances from the devices 102. The image capture device 101 may then receive the profile data stored on each device 102-104, which includes the images 112-114, the rules 115-117, and any other metadata stored in the user profiles 109-111 (such as contact lists, social media connections, preferences, and the like).

The image capture device 101 may use the received data from the devices 102-104 when capturing images. Generally, the image capture device 101 may compare the faces of the people 106-108 to the profile photos 112-114 received from the devices 102-104. If the image capture device 101 determines that a match exists, the image capture device 101 may apply the rules 115-117 of the respective profiles 109-111 before capturing an image.

The boxes 118-120 depict example results of the comparison of the faces of the people 106-108 to the profile photos 112-114 performed by the image capture device 101. As shown, the face of person 106 matches with the profile photo 112 of profile 109, while the face of person 107 matches the profile photo 114 of profile 111, and the face of person 108 matches the profile photo 113 of profile 110. As such, the image capture device 101 must apply the local rules and the remote rules 115-117 to modify the image data captured by the image sensor prior to generating an image for output and/or storage.

Figure 1B:
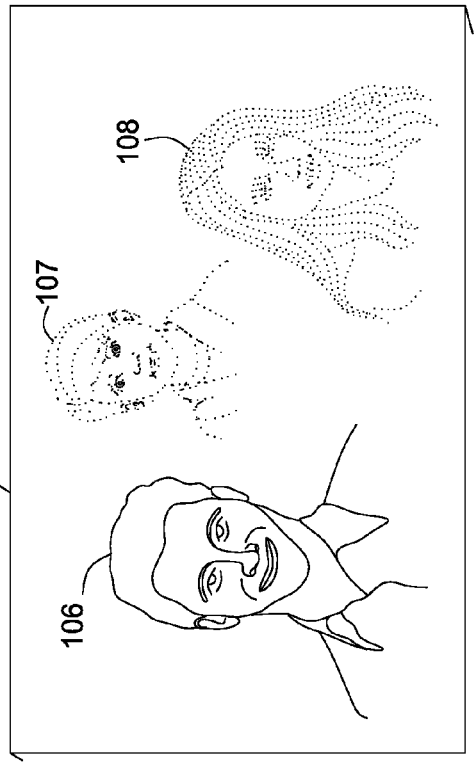
Figure 1B:
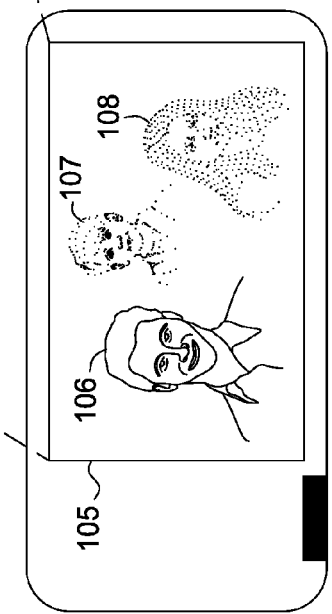

FIG. 1B depicts an example image 121 generated by the image capture device 101 after applying local rules and the remote rules 115-117 prior to capturing the image 121. As shown on the display 105, the image capture device 101 has modified the image data provided by the image sensor such that the person 106 is depicted, but persons 107-108 are not depicted. For example, the image capture device 101 may camouflage the persons 107-108, delete the image data corresponding to the location of the persons 107-108, distort the persons 107-108 using a filter applied to the image data, and the like. Furthermore, the resultant image 121 mirrors the display 105 in that person 106 is depicted in the image 121, while persons 107-108 are not depicted in the image 121.

For example, the image capture device 101 may determine, based on the rules 115, that the person 106 can be depicted in images. However, the local rules for the image capture device 101 must also be satisfied. Therefore, the image capture device 101 may include the person 106 in the generated image 121 because the person 106 is a personal contact of the user of the image capture device 101 and because the rules 115 permit depiction of the person 106 in the image 121. Similarly, the image capture device 101 may reference the rules 116 to determine that person 108 cannot be depicted in the image 121, as the rules 116 explicitly state that the person 108 cannot be depicted in any images. Therefore, even if the person 108 was a personal contact of the user of the image capture device 101, the rules 116 would override the local rules in the image capture device 101, and the person 108 is not depicted in the image 121. Furthermore, the image capture device 101 may apply the rules 117 to determine that the person 107 permits their image to be depicted only by known contacts. As shown in box 120, however, the user of the image capture device 101 and the person 107 are not contacts. Therefore, the image capture device 101 generates the image 121 that does not include the person 107 based on the remote rules 117 and the local rules of the image capture device 101.

Figure 2:
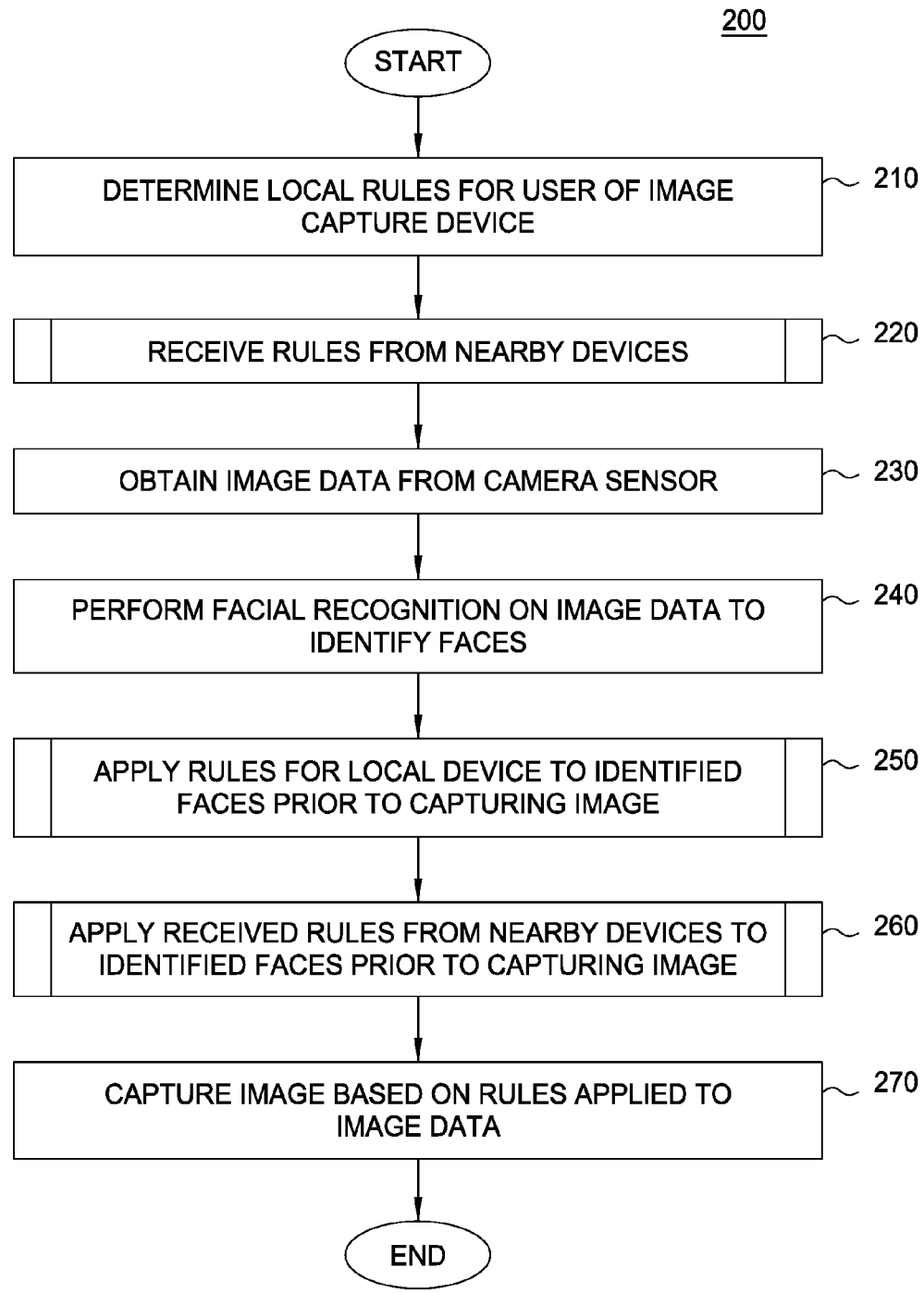
FIG. 2 illustrates an example method to intelligently capture digital images based on user preferences, according to one embodiment.

FIG. 2 illustrates an example method 200 to intelligently capture digital images based on user preferences, according to one embodiment. In at least one embodiment, the image capture device 101 performs the steps of the method 200. As shown, the method 200 begins at block 210, where the image capture device 101 determines the local rules for a user of the image capture device 101. The rules may be stored in a user profile, and may specify any rules related to image capture. For example, the user may specify that only family members should be depicted in images taken in a first location, while second degree contacts (e.g., friends of friends) and closer contacts should be depicted in images taken at a second location. The user profile may be stored in the image capture device 101 or at a remote location (e.g., the cloud). The rules may also specify what methods the image capture device 101 should use in obfuscating people from images (e.g., placing an object over the person, distorting their likeness, filling a portion of a bitmap for the image corresponding to the person with dummy data, and the like.

At block 220, described in greater detail with reference to FIG. 3, the image capture device 101 may receive rules from nearby devices. Generally, at block 220, the image capture device 101 may wirelessly communicate with devices within a threshold distance to receive profile data for participating users. The profile data may include an image of each user having a user profile on the nearby devices, as well as rules and/or settings for each profile on the nearby devices. At block 230, the image capture device 101 may obtain image data from an image sensor of the image capture device 101. More generally, a user of the image capture device 101 may engage the camera feature of the image capture device 101, such as opening a camera application which displays the image data captured by the image sensor, or turning on an image capture mode of a digital camera.

At block 240, the image capture device 101 may perform facial recognition on the image data obtained from the image sensor to identify faces in the image data. The image capture device 101 may use any facial recognition algorithm to analyze the image data and identify faces therein. At block 250, described in greater detail with reference to FIG. 4, the image capture device 101 may apply the rules of the user of the image capture device 101 to the faces identified in the image data prior to capturing an image. Generally, at block 250, the image capture device 101 may determine whether to obfuscate each face identified at block 240 based on the local rules. At block 260, described in greater detail with reference to FIG. 5, the image capture device 101 may apply the rules received from nearby devices to the faces identified in the image data prior to capturing an image. Generally, at block 260, the image capture device 101 may determine whether to obfuscate each face identified at block 240 based on the received rules. At block 270, the image capture device 101 may capture an image based on the local and remote user rules applied to the image data.

Figure 3:
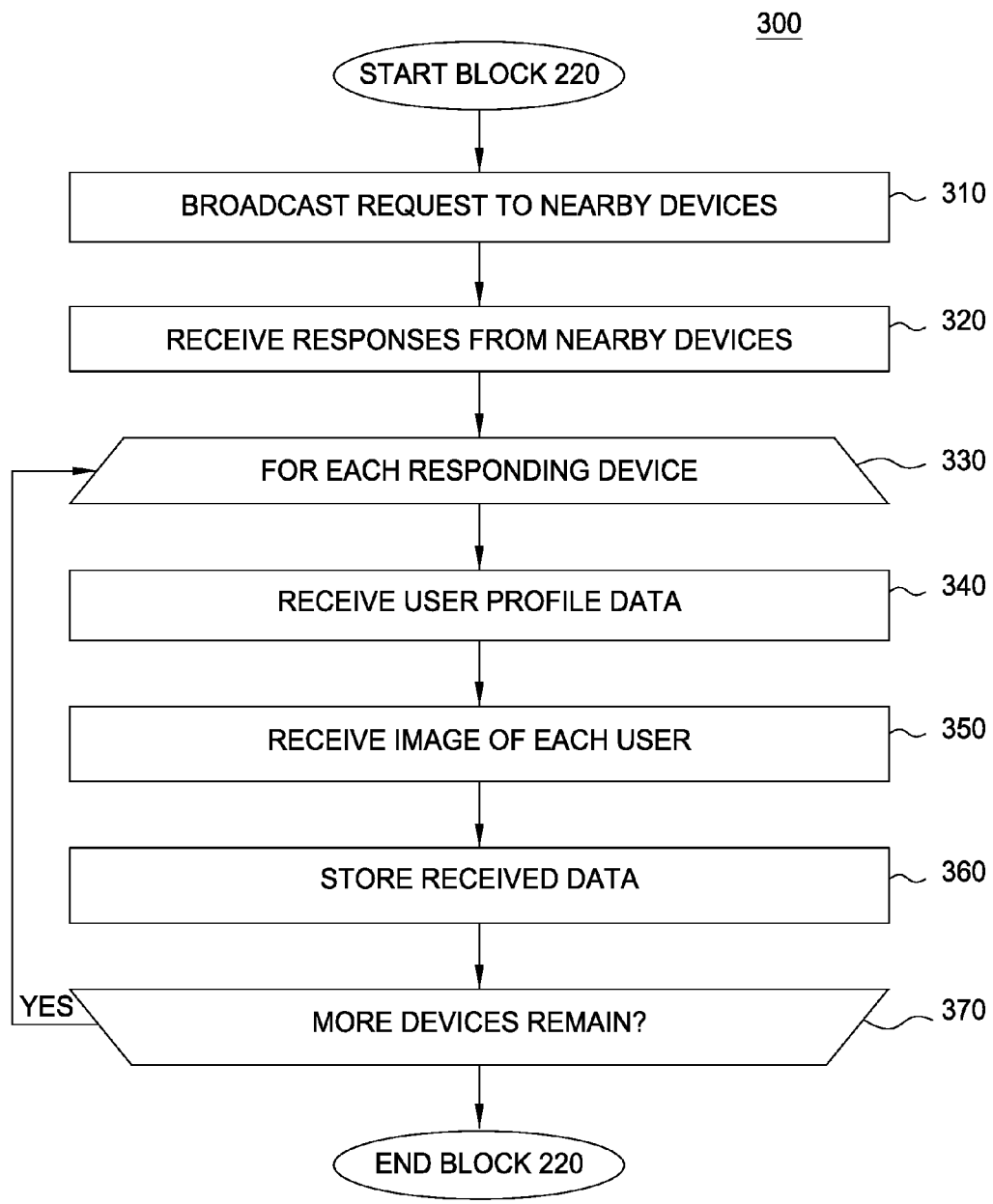
FIG. 3 is a flow chart illustrating an example method to receive rules from nearby devices, according to one embodiment.

FIG. 3 is a flow chart illustrating an example method 300 corresponding to block 220 to receive rules from nearby devices, according to one embodiment. As shown, the method 300 begins at block 310, where the image capture device 101 broadcasts a request to nearby devices. The image capture device 101 may use any wireless communications medium to communicate with the nearby devices, such as Bluetooth®, Wi-Fi®, near field communications (NFC), and the like. At block 320, the image capture device 101 may receive responses from one or more nearby devices. The responses may specify profile data for one or more users associated with each nearby device. The profile data may include an image of each user, a plurality of image capture rules, and other user metadata. In at least one embodiment, the image capture device 101 may discard responses from devices that are not within a threshold distance of the image capture device 101.

At block 330, the image capture device 101 executes a loop including blocks 340-370 for each device which responds to the image capture device 101 at block 320. At block 340, the image capture device 101 receives the user profile data for one or more user profiles stored on the current responding device. The profile data may include contact metadata, metadata describing social media contacts, biographical information of the user, preferred rules for sharing and/or storing images depicting the user, and the like. At block 350, the image capture device 101 receives an image for each user having a user profile stored on the current responding device. At block 360, the image capture device 101 may store the data received from the responding devices. At block 370, the image capture device 101 determines whether more responding devices remain. If more responding devices remain, the image capture device 101 returns to block 330. Otherwise, the method 300 ends.

Figure 4:
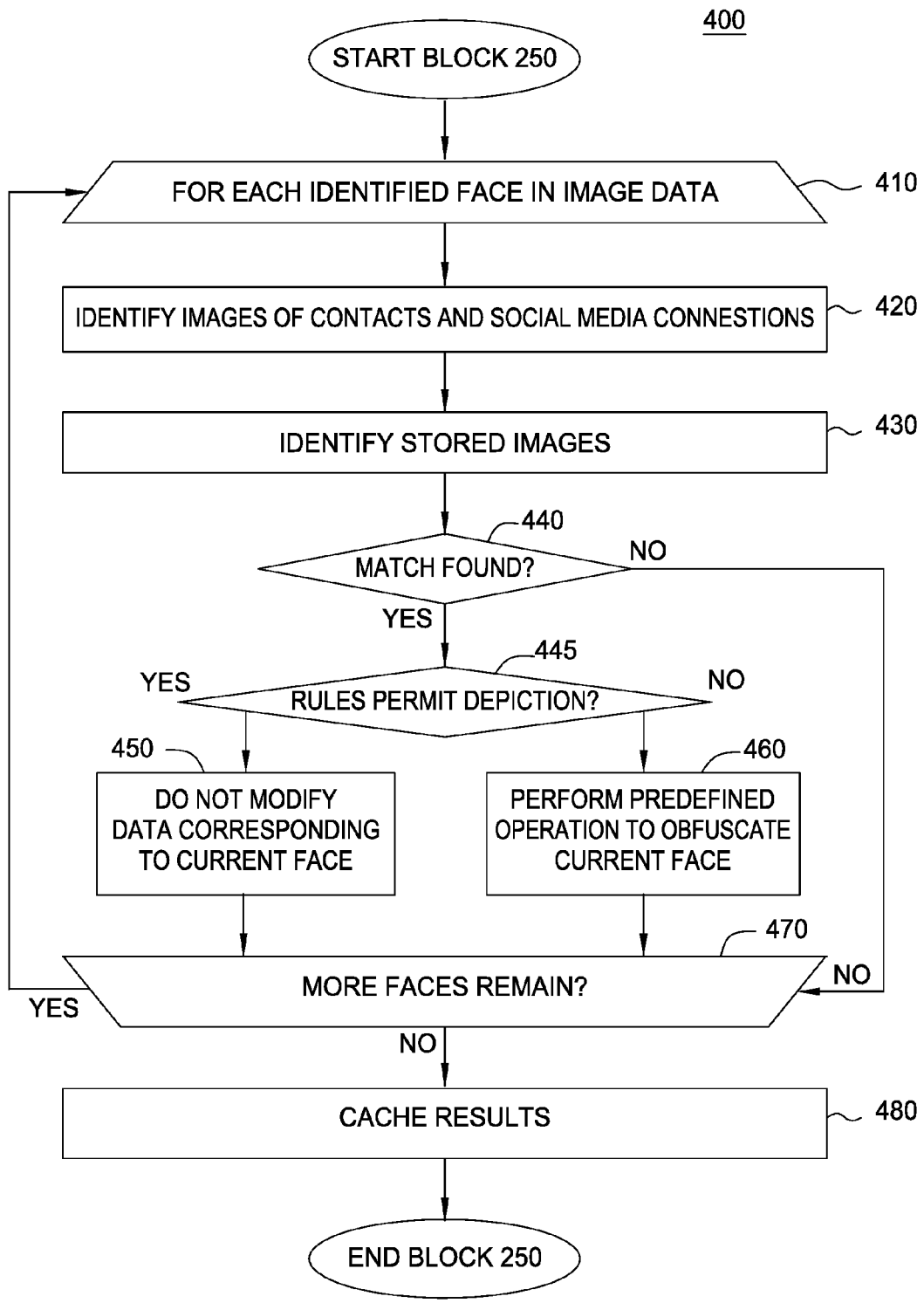
FIG. 4 is a flow chart illustrating an example method to apply local rules to faces identified in image data prior to capturing an image, according to one embodiment.

FIG. 4 is a flow chart illustrating an example method 400 corresponding to block 250 to apply rules for a local device to faces identified in image data prior to capturing an image, according to one embodiment. As shown, the method 400 begins at block 410, where the image capture device 101 executes a loop including blocks 420-470 for each face identified in the image data at block 240. In at least one embodiment, the image capture device 101 executes the loop including blocks 420-470 in parallel for each face identified in the image data at block 240. At block 420, the image capture device 101 identifies the images of contacts and social media connections for the current user of the image capture device 101.

At block 430, the image capture device 101 may identify images stored on the image capture device 101 and/or at a remote storage location (e.g., the cloud). At block 440, the image capture device 101 determines whether one or more images identified at blocks 420 and 430 matches the current face identified in the image data. Generally, the match is based on a comparison of the images to determine whether the person identified in each image is the same. If a match is not found, the image capture device 101 may proceed to block 470. However, in at least one embodiment, the image capture device may proceed to block 445 even if a match is not found, as the user of the current device may specify that capturing an image of unknown users is permitted.

Returning to block 440, if a match is found, the image capture device 101 proceeds to block 445. At block 445, the image capture device 101 determines whether the rules of the current user of the image capture device 101 permit depiction of the current face. Generally, at block 445, the image capture device 101 determines whether the rules and rules of the user of the image capture device 101 are satisfied by at least one metadata (or profile) attribute of the profile of a matching user. If the rules permit depiction of the current face, the image capture device 101 proceeds to block 450. At block 450, the image capture device 101 does not modify the image data corresponding to the current face. Generally, at block 450, the image capture device 101 does not modify the image data because the current face in the image data corresponds to an image of a user that satisfies the rules specified by the user of the image capture device 101. For example, the current face may belong to someone who is a contact or family member of the user of the image capture device 101, and the user of the image capture device 101 has specified a rule that only personal contacts or family members can be depicted in the images generated by the image capture device 101. Similarly, the current face may belong to a social media contact who is within a specified degree of contacts specified by the user of the image capture device 101. However, as previously indicated, the rules may permit depiction of the current face even if a match is not found at block 440, as the profile of the user of the image capture device 101 may permit depiction of faces that do not have a match.

Returning to block 445, if the rules specified in the user profile of the current user of the image capture device 101 do not permit depiction of the current face, the image capture device 101 proceeds to block 460. For example, metadata of the current person depicted in the image may not satisfy the rules of the user of the image capture device 101. For example, the person depicted in the image may not be a contact of the user of the image capture device 101, in violation of the rules of the current user of the image capture device 101. At block 460, the image capture device 101 may perform a predefined operation to obfuscate the current face. As previously indicated, the image capture device 101 may perform any type of operation to obfuscate the current face, such as placing an object over the current face, blurring the face, and the like. At block 470, the image capture device 101 determines whether more faces remain in the image data. If more faces remain, the image capture device 101 returns to block 410. If no more faces remain, the image capture device 101 proceeds to block 480, where the image capture device 101 may cache the results of the comparisons performed at blocks 440 and 445. Doing so allows the image capture device 101 to reference the stored data when subsequently determining whether to depict each person's face in an image based on the profile rules of the user of the image capture device 101.

Figure 5:
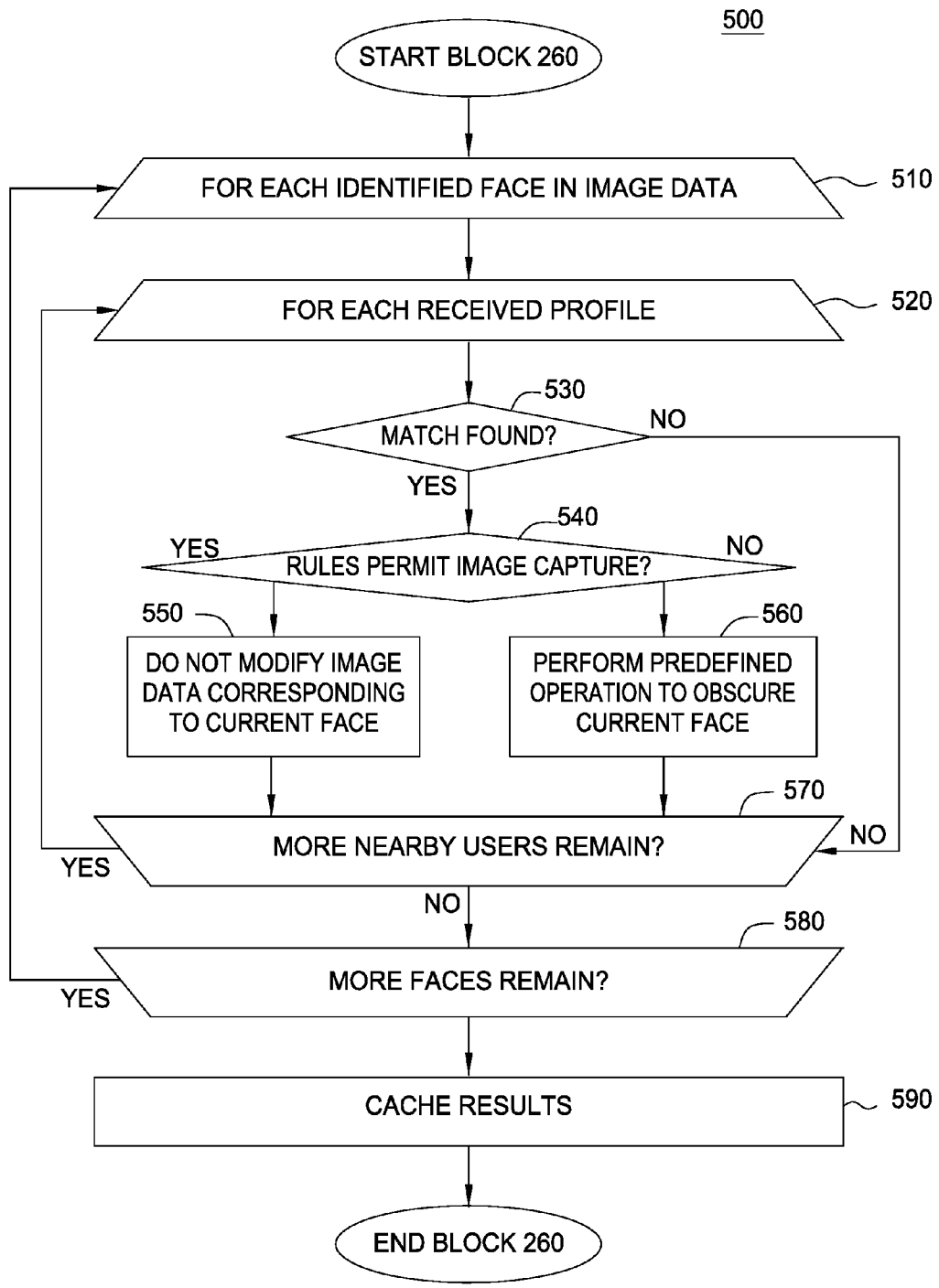
FIG. 5 is a flow chart illustrating an example method to apply rules received from nearby devices to faces identified in image data prior to capturing an image, according to one embodiment.

FIG. 5 is a flow chart illustrating an example method 500 corresponding to block 260 to apply received rules from nearby devices to faces identified in image data prior to capturing an image, according to one embodiment. As shown, the method 500 begins at block 510, where the image capture device 101 executes a loop including blocks 520-580 for each face identified in the image data at block 240. In at least one embodiment, the image capture device 101 executes the loop including blocks 520-580 in parallel for each face identified in the image data at block 240. At block 520, the image capture device 101 executes a loop including blocks 530-570 for each user profile received at block 220, where each profile includes an image of an associated user associated.

At block 530, the image capture device 101 determines whether the current face identified in the image data matches the image of the user associated with the current user profile. If a match is found, the image capture device 101 proceeds to block 540. If a match is not found, the image capture device 101 proceeds to block 570. At block 540, the image capture device 101 determines whether the rules specified in the user profile including the image matching the current face permit capture of the user's image. If the rules permit capture of the user's image, the image capture device 101 proceeds to block 550. At block 550, the image capture device 101 does not modify the image data corresponding to the current face, as the identified user rules received from the remote devices permit capture of an image of the user. The method may then proceed to block 570.

Returning to block 540, if the rules received from the device of the user matching the current face specify that an image of the user cannot be depicted, the image capture device 101 proceeds to block 560. For example, the user may not want unknown persons to capture their image. As another example, the user may only want classmates to be able to capture their image. At block 560, the image capture device 101 may perform a predefined operation to obfuscate the current face. As previously indicated, the image capture device 101 may perform any type of operation to obfuscate the current face, such as placing an object over the current face, blurring the face, and the like. The method may then proceed to block 570.

At block 570, the image capture device 101 determines whether more nearby users remain. If more nearby users remain, the image capture device returns to block 520. If no more nearby users remain, the image capture device proceeds to block 580, where the image capture device 101 determines whether more faces remain in the image data. If more faces remain, the image capture device 101 returns to block 510. If no more faces remain, the image capture device 101 proceeds to block 590, where the image capture device 101 may cache the results of the comparisons performed at blocks 530 and 540. Doing so allows the image capture device 101 to reference the stored data when subsequently determining whether to depict each person's face in an image based on the profile rules of the user of the image capture device 101.

Figure 6:
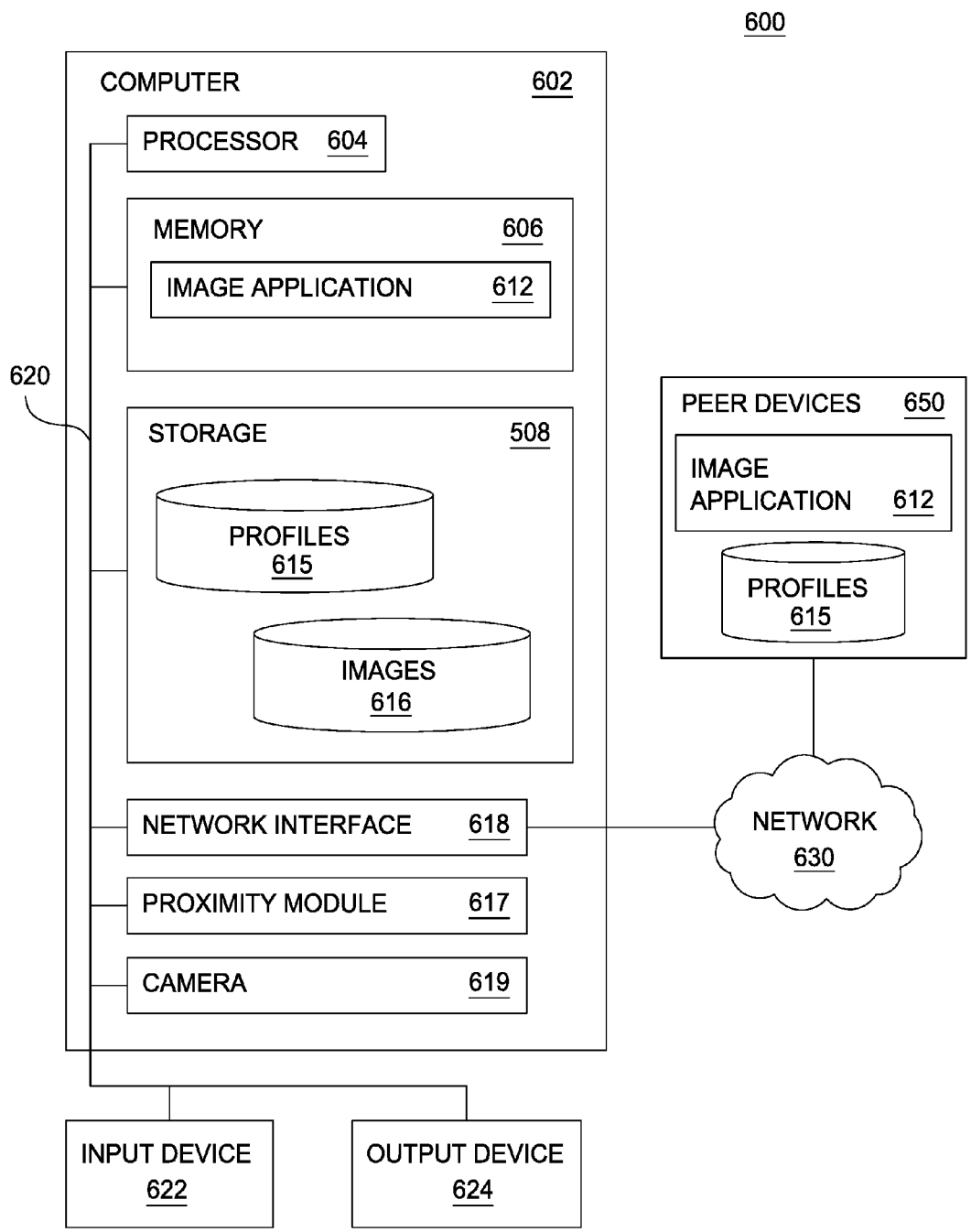
FIG. 6 illustrates an example system which intelligently captures digital images based on user preferences, according to one embodiment.

FIG. 6 illustrates an example system 600 which intelligently captures digital images based on user preferences, according to one embodiment. The networked system 600 includes a computer 602. The computer 602 may also be connected to other computers via a network 630. In general, the network 630 may be a telecommunications network and/or a wide area network (WAN). In a particular embodiment, the network 630 is the Internet.

The computer 602 generally includes a processor 604 which obtains instructions and data via a bus 620 from a memory 606 and/or a storage 608. The computer 602 may also include a proximity module 617, one or more network interface devices 618, camera 619, input devices 622, and output devices 624 connected to the bus 620. The computer 602 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the computer 602 to communicate with other computers via the network 630.

The storage 608 is representative of hard-disk drives, solid state drives, flash memory devices, optical media and the like. Generally, the storage 608 stores application programs and data for use by the computer 602. In addition, the memory 606 and the storage 608 may be considered to include memory physically located elsewhere; for example, on another computer coupled to the computer 602 via the bus 620.

The proximity module 617 is representative of any type of module which provides location estimates for the computer 602. Examples of the proximity module 617 include GPS modules, Bluetooth radios, and the like. The camera 619 is representative of any image capture device which digitally encodes image and videos based on data received from an image sensor (not pictured). The input device 622 may be any device for providing input to the computer 602. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the image application 612, which facilitates intelligent capture of images by the camera 619 based on user preferences. Generally, the image application 612 may perform a predefined operation to obscure at least a portion of a person's body (e.g., the face, torso, etc.) upon determining one or more rules in the profiles 615 do not permit depiction of the person in an image generated by the camera 619. For example, a user of the computer 602, which may be a smartphone including a digital camera, may specify in the profiles 615 to exclude the faces of unknown users in images generated by the camera 619. The image application 612 may then identify faces in the image data captured by the image sensor of the camera 619, and perform facial recognition on the faces to determine whether the faces are associated with known contacts (e.g., in an address book, social media connections lists, and the like) of the user. If the faces do not belong to known contacts, the image application 612 may cause the camera 619 to perform a predefined operation on image data provided by the image sensor prior to capturing the image. The predefined operation may be any type of operation, such as placing a user-specified object over the area where the unknown faces are present, scrambling the faces, or otherwise obscuring the unknown faces.

Similarly, the image application 612 may receive and apply the rules of users of one or more nearby peer devices 650. For example, a user of a first peer device 650 may specify to restrict their depiction in any generated image. The image application 612 may then receive the profile 615 of the user of the first peer device 650, which may include an image of the user. The image application 612 may then compare the image data provided by the image sensor of the camera 619 to the image of the user to determine whether the user is depicted in the image data. If the user is depicted in the image data, the image application 612 may cause the camera 619 to perform a predefined operation to restrict depiction of the user of the first peer device 650 in an image subsequently generated for output by the camera 619.

As shown, the storage 608 contains the profiles 615 and the images 616. The profiles 615 stores profile data for one or more users. The profile data stored in the profiles 615 may include an image of each user, rules for capturing an image of the associated user, and rules for who can be depicted in images generated by the user. For example, a first user may specify that classmates and family members can capture their image, and that images generated by the first user can include known contacts and first through third degree social media connections. The images 616 stores images generated by the camera 619.

As shown, a plurality of peer devices 650 include an instance of the image application 612 and a profiles 650. When the computer 602 is within a predefined distance (as determined based on the proximity module 617) of one or more of the peer devices 650, the computer 602 and peer devices 650 may share data stored in the respective profiles 615. Doing so allows the image application 612 on the peer devices 650 and the computer 602 to apply the rules of nearby users when capturing images. Similarly, the peer devices 650 may share the profile data stored in the profiles 615 with each other.

Advantageously, embodiments disclosed herein provide techniques to capture digital images based on user-specified rules stored in user profiles. Users may specify who can be depicted in images they capture, as well as who can capture their image. Doing so enhances the field of digital imagery by respecting the personal privacy of users without the need for constant manual intervention. Similarly, by performing a predefined operation to restrict depiction of a user prior to capturing an image, embodiments disclosed herein improve the functioning of image capture devices by reducing the storage space required to store images, as well as reducing the amount of post-processing required for generated images.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the image application 612 could execute on a computing system in the cloud. In such a case, the image application 612 may store profile data for a plurality of users at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving image data provided by an image sensor of a device;
   identifying, based on a facial recognition algorithm applied to the image data, a first face and a second face in the image data;
   identifying a plurality of image capture rules;
   determining that a first rule of the plurality of image capture rules restricts depiction of the first face in an image;
   performing a predefined operation to restrict depiction of the first face in the image data provided by the image sensor;
   determining that a second rule of the plurality of image capture rules permits depiction of the second face in images captured at a first predefined location, wherein the second rule further requires a threshold degree of relationship between a first user profile of the device and a second user profile associated with the second face;
   determining that the device is proximate to the first predefined location;
   determining that the threshold degree of relationship exists between the first and second user profiles; and
   generating an image for output based on the image data, wherein the generated image depicts the second face and does not depict the first face.

2. The method of claim 1, further comprising prior to identifying the plurality of rules:
   determining that a plurality of user devices are within a predefined distance of the device;
   receiving at least one user profile from each of the plurality of user devices, wherein each profile includes a respective user image associated with each profile;
   comparing the first face in the image data to the plurality of user images;
   determining, based on the comparing, that the first face is associated with a third user profile of the received user profiles, wherein the first rule is specified in the third user profile and specifies to restrict depiction of the first face in the generated image.

3. The method of claim 2, further comprising:
   comparing the second face in the image data to the plurality of user images;
   determining, based on the comparing, that the second face is associated with the second user profile, of the plurality of user profiles, wherein the second rule is specified in the second user profile;
   identifying the threshold degree of relationship between the first and second user profiles;
   refraining from performing the predefined operation to restrict depiction of the second face in the image data provided by the image sensor;
   identifying, based on the facial recognition algorithm applied to the image data, a third face in the image data;
   comparing the third face in the image data to the plurality of user images;
   determining that a third rule of the plurality of image capture rules requires the threshold degree of relationship between a fourth user profile associated with the third face and the first user profile;
   determining that the threshold degree of relationship between the first and fourth user profiles does not exist; and
   performing the predefined operation to restrict depiction of the third face in the image data provided by the image sensor, wherein the generated image does not depict the third face.

4. The method of claim 1, wherein the first rule is defined by a user of the device, the method further comprising:
   comparing the first face in the image data to a plurality of user images, wherein each user image of the plurality of user images are received from one or more of: (i) the device, and (ii) a remote device, wherein determining that the first rule restricts depiction of the first face in the image comprises:
      determining that the first rule requires an association between a user profile of each person depicted in the image data and the first user profile of the device;
      determining, based on the comparing, that the first face is associated with a third user profile, of a plurality of user profiles; and
      determining, that an association between the third user profile and the first user profile of the device does not exist.

5. The method of claim 4, further comprising:
   comparing the second face in the image data to the plurality of user images;
   determining, based on the comparing, that the second face is associated with the second user profile, of the plurality of user profiles;
   identifying an association between the second user profile and the first user profile of the device; and
   refraining from performing the predefined operation to restrict depiction of the second face in the image data provided by the image sensor.

6. The method of claim 1, further comprising:
   prior to performing the predefined operation, outputting the image data for display on a display device of the device including, wherein the image data outputted on the display device depicts the first face; and
   subsequent to performing the predefined operation, outputting the image data for display on the display device of the device, wherein the image data outputted on the display device does not depict the first face subsequent to performing the predefined operation.

7. The method of claim 1, wherein the predefined operation comprises one or more of: (i) scrambling the image data corresponding to the first face, (ii) overwriting the image data corresponding to the first face with image data corresponding to a predefined object, and (iii) overwriting the image data corresponding to the first face with image data generated by a filter configured to blur image data.

8. A computer program product, comprising:
a non-transitory computer-readable storage medium having computer readable program code embodied therewith, the computer readable program code executable by a processor to perform an operation comprising:
receiving image data provided by an image sensor of a device;
identifying, based on a facial recognition algorithm applied to the image data, a first face and a second face in the image data;
identifying a plurality of image capture rules;
determining that a first rule of the plurality of image capture rules restricts depiction of the first face in an image;
performing a predefined operation to restrict depiction of the first face in the image data provided by the image sensor;
determining that a second rule of the plurality of image capture rules permits depiction of the second face in images captured at a first predefined location, wherein the second rule further requires a threshold degree of relationship between a first user profile of the device and a second user profile associated with the second face;
determining that the device is proximate to the first predefined location;
determining that the threshold degree of relationship exists between the first and second user profiles; and
generating an image for output based on the image data, wherein the generated image depicts the second face and does not depict the first face.

9. The computer program product of claim 8, the operation further comprising prior to identifying the plurality of rules:
determining that a plurality of user devices are within a predefined distance of the device;
receiving at least one user profile from each of the plurality of user devices, wherein each profile includes a respective user image associated with each profile;
comparing the first face in the image data to the plurality of user images;
determining, based on the comparing, that the first face is associated with a third user profile of the received user profiles, wherein the first rule is specified in the third user profile and specifies to restrict depiction of the first face in the generated image.

10. The computer program product of claim 9, the operation further comprising:
comparing the second face in the image data to the plurality of user images;
determining, based on the comparing, that the second face is associated with the second user profile, of the plurality of user profiles, wherein the second rule is specified in the second user profile;
identifying the threshold degree of relationship between the first and second user profiles;
refraining from performing the predefined operation to restrict depiction of the second face in the image data provided by the image sensor;
identifying, based on the facial recognition algorithm applied to the image data, a third face in the image data;
comparing the third face in the image data to the plurality of user images;
determining that a third rule of the plurality of image capture rules requires the threshold degree of relationship between a fourth user profile associated with the third face and the first user profile;
determining that the threshold degree of relationship between the first and fourth user profiles does not exist; and
performing the predefined operation to restrict depiction of the third face in the image data provided by the image sensor, wherein the generated image does not depict the third face.

11. The computer program product of claim 8, wherein the first rule is defined by a user of the device, the operation further comprising:
comparing the first face in the image data to a plurality of user images, wherein each user image of the plurality of user images are received from one or more of: (i) the device, and (ii) a remote device, wherein determining that the first rule restricts depiction of the first face in the image comprises:
determining that the first rule requires an association between a user profile of each person depicted in the image data and the first user profile of the device;
determining, based on the comparing, that the first face is associated with a third user profile, of a plurality of user profiles; and
determining, that an association between the third user profile and the first user profile of the device does not exist.

12. The computer program product of claim 11, the operation further comprising:
comparing the second face in the image data to the plurality of user images;
determining, based on the comparing, that the second face is associated with the second user profile, of the plurality of user profiles;
identifying an association between the second user profile and the first user profile of the user of the device; and
refraining from performing the predefined operation to restrict depiction of the second face in the image data provided by the image sensor.

13. The computer program product of claim 8, the operation further comprising:
prior to performing the predefined operation, outputting the image data for display on a display device of the device, wherein the image data outputted on the display device depicts the first face; and
subsequent to performing the predefined operation, outputting the image data for display on the display device of the device, wherein the image data outputted on the display device does not depict the first face subsequent to performing the predefined operation.

14. The computer program product of claim 8, wherein the predefined operation comprises one or more of: (i) scrambling the image data corresponding to the first face, (ii) overwriting the image data corresponding to the first face with image data corresponding to a predefined object, and (iii) overwriting the image data corresponding to the first face with image data generated by a filter configured to blur image data.

15. A system, comprising:
a processor;
an image sensor; and
a memory storing one or more instructions which, when executed by the processor, performs an operation comprising:
receiving image data provided by an image sensor of a device;

identifying, based on a facial recognition algorithm applied to the image data, a first face and a second face in the image data;

identifying a plurality of image capture rules;

determining that a first rule of the plurality of image capture rules restricts depiction of the first face in an image;

performing a predefined operation to restrict depiction of the first face in the image data provided by the image sensor;

determining that a second rule of the plurality of image capture rules permits depiction of the second face in images captured at a first predefined location, wherein the second rule further requires a threshold degree of relationship between a first user profile of the device and a second user profile associated with the second face;

determining that the device is proximate to the first predefined location;

determining that the threshold degree of relationship exists between the first and second user profiles; and generating an image for output based on the image data, wherein the generated image depicts the second face and does not depict the first face.

16. The system of claim 15, the operation further comprising prior to identifying the plurality of rules:

determining that a plurality of user devices are within a predefined distance of the device;

receiving at least one user profile from each of the plurality of user devices, wherein each profile includes a respective user image associated with each profile;

comparing the first face in the image data to the plurality of user images;

determining, based on the comparing, that the first face is associated with a third user profile of the received user profiles, wherein the first rule is specified in the third user profile and specifies to restrict depiction of the first face in the generated image.

17. The system of claim 16, the operation further comprising:

comparing the second face in the image data to the plurality of user images;

determining, based on the comparing, that the second face is associated with the second user profile, of the plurality of user profiles, wherein the second rule is specified in the second user profile;

identifying the threshold degree of relationship between the first and second user profiles;

refraining from performing the predefined operation to restrict depiction of the second face in the image data provided by the image sensor;

identifying, based on the facial recognition algorithm applied to the image data, a third face in the image data;

comparing the third face in the image data to the plurality of user images;

determining that a third rule of the plurality of image capture rules requires the threshold degree of relationship between a fourth user profile associated with the third face and the first user profile;

determining that the threshold degree of relationship between the first and fourth user profiles does not exist; and performing the predefined operation to restrict depiction of the third face in the image data provided by the image sensor, wherein the generated image does not depict the third face.

18. The system of claim 15, wherein the first rule is defined by a user of the system, the operation further comprising:

comparing the first face in the image data to a plurality of user images, wherein each user image of the plurality of user images are received from one or more of: (i) the system, and (ii) a remote device, wherein determining that the first rule restricts depiction of the first face in the image comprises:

determining that the first rule requires an association between a user profile of each person depicted in the image data and the first user profile of the device;

determining, based on the comparing, that the first face is associated with a third user profile, of a plurality of user profiles; and determining, that an association between the third user profile and the first user profile of the device does not exist.

19. The system of claim 15, the operation further comprising:

comparing the second face in the image data to the plurality of user images;

determining, based on the comparing, that the second face is associated with the second user profile, of the plurality of user profiles;

identifying an association between the second user profile and the first user profile of the user of the device; and refraining from performing the predefined operation to restrict depiction of the second face in the image data provided by the image sensor.

20. The system of claim 15, wherein the predefined operation comprises one or more of: (i) scrambling the image data corresponding to the first face, (ii) overwriting the image data corresponding to the first face with image data corresponding to a predefined object, and (iii) overwriting the image data corresponding to the first face with image data generated by a filter configured to blur image data, wherein the operation further comprises:

prior to performing the predefined operation, outputting the image data for display on a display device of the system, wherein the image data outputted on the display device depicts the first face; and subsequent to performing the predefined operation, outputting the image data for display on the display device of the device, wherein the image data outputted on the display device does not depict the first face subsequent to performing the predefined operation.

* * * * *